Aug. 1, 1944.  B. P. LAWSON  2,354,690
MECHANISM FOR ASSEMBLING SLIDERS
Filed Nov. 5, 1942  6 Sheets-Sheet 1
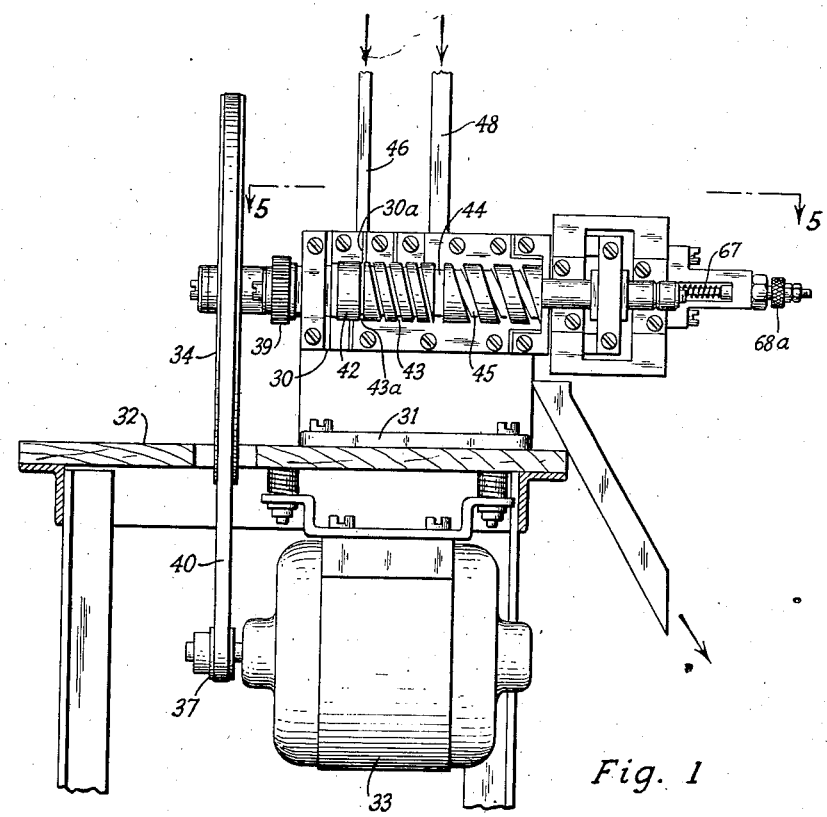
Fig. 1
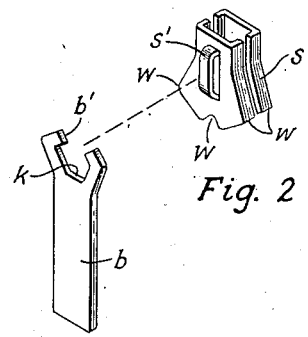
Fig. 2
Fig. 3
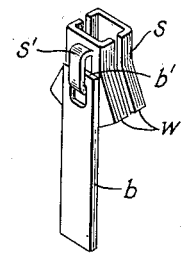
Fig. 4
INVENTOR.
Birdsall P. Lawson
BY
ATTORNEY Aug. 1, 1944.  B. P. LAWSON  2,354,690
MECHANISM FOR ASSEMBLING SLIDERS
Filed Nov. 5, 1942  6 Sheets-Sheet 2
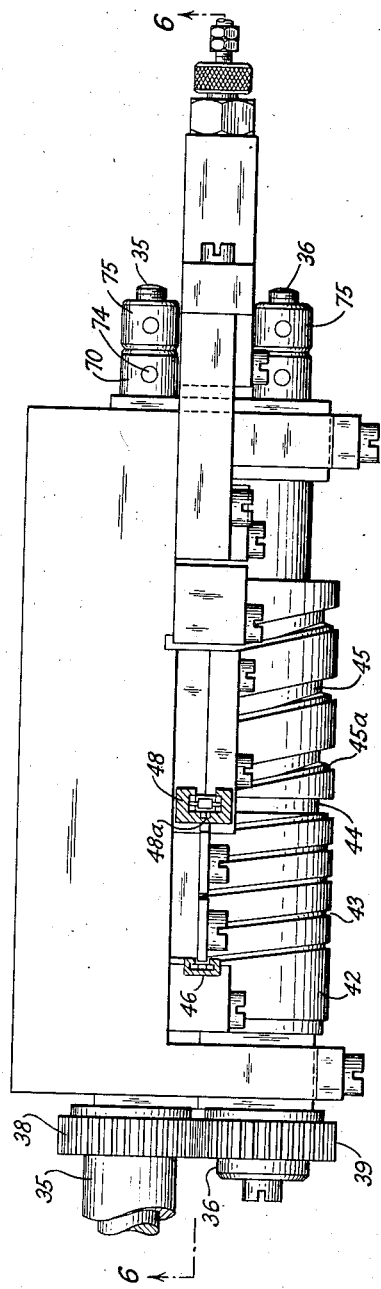
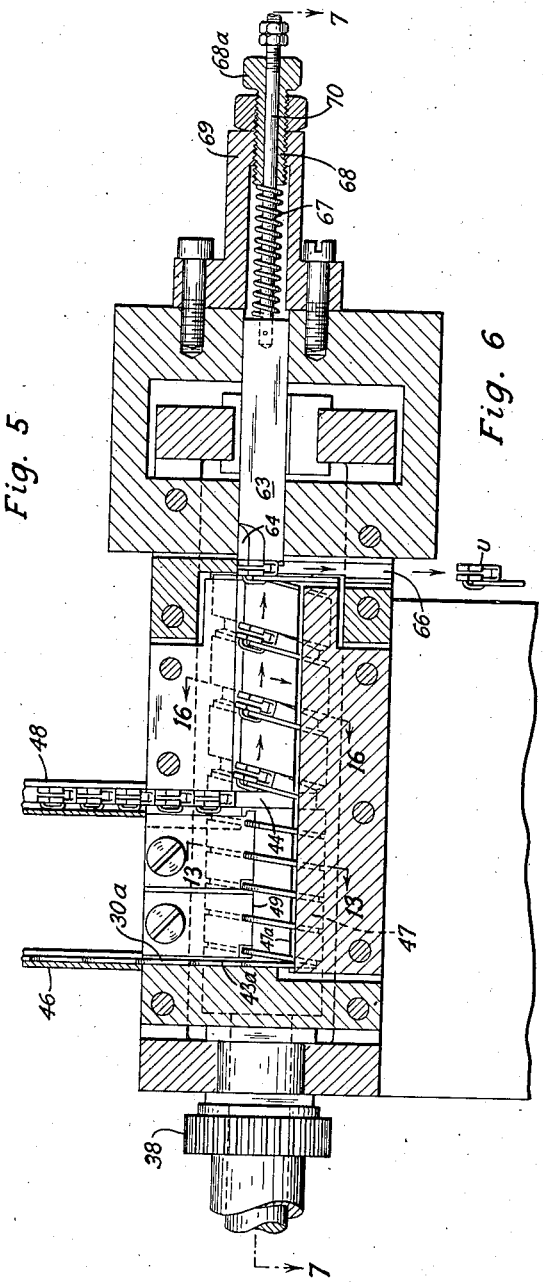
INVENTOR.
Birdsall P. Lawson
BY
ATTORNEY Aug. 1, 1944.  B. P. LAWSON  2,354,690
MECHANISM FOR ASSEMBLING SLIDERS
Filed Nov. 5, 1942  6 Sheets-Sheet 3
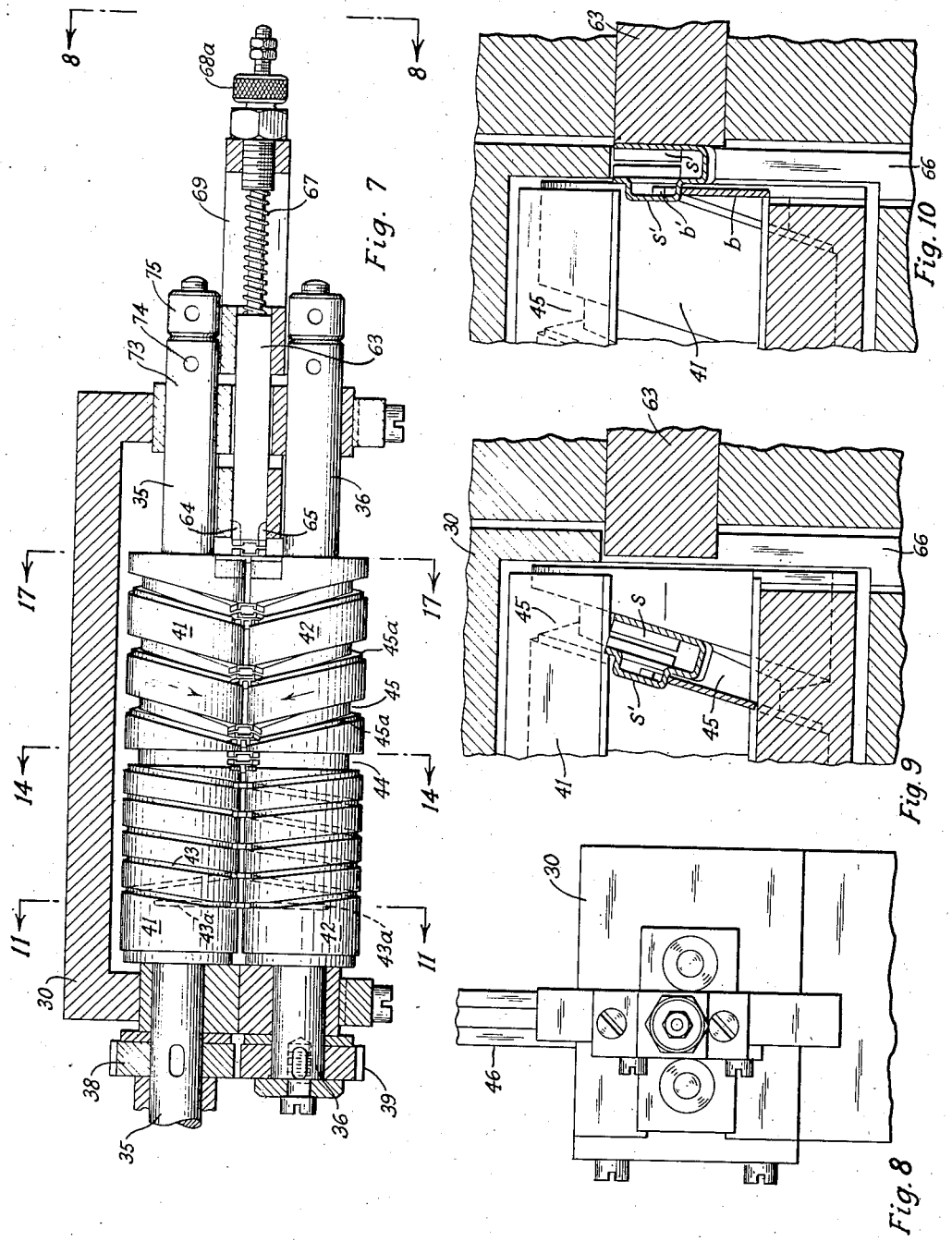
INVENTOR.
Birdsall P. Lawson
BY
ATTORNEY

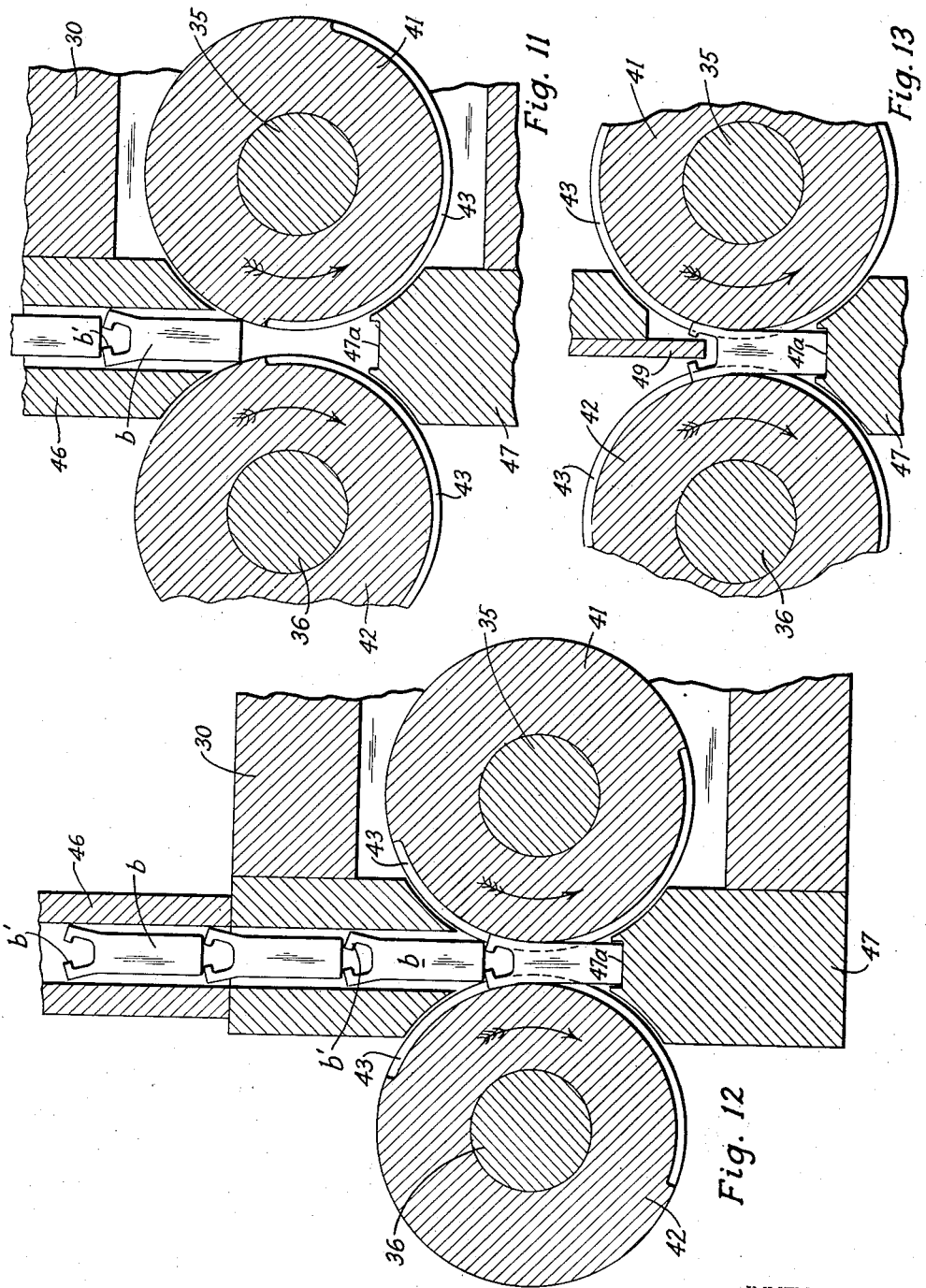

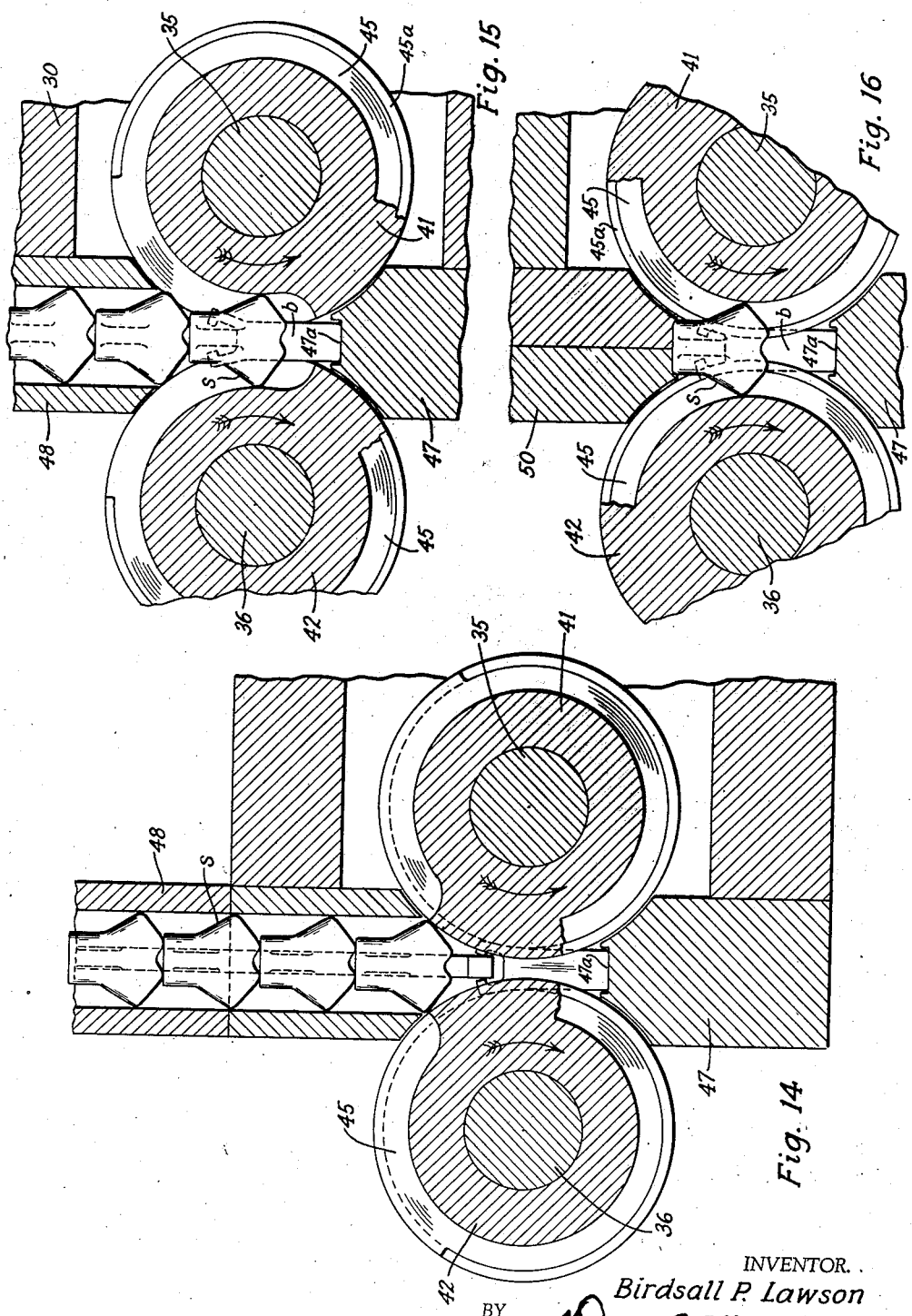

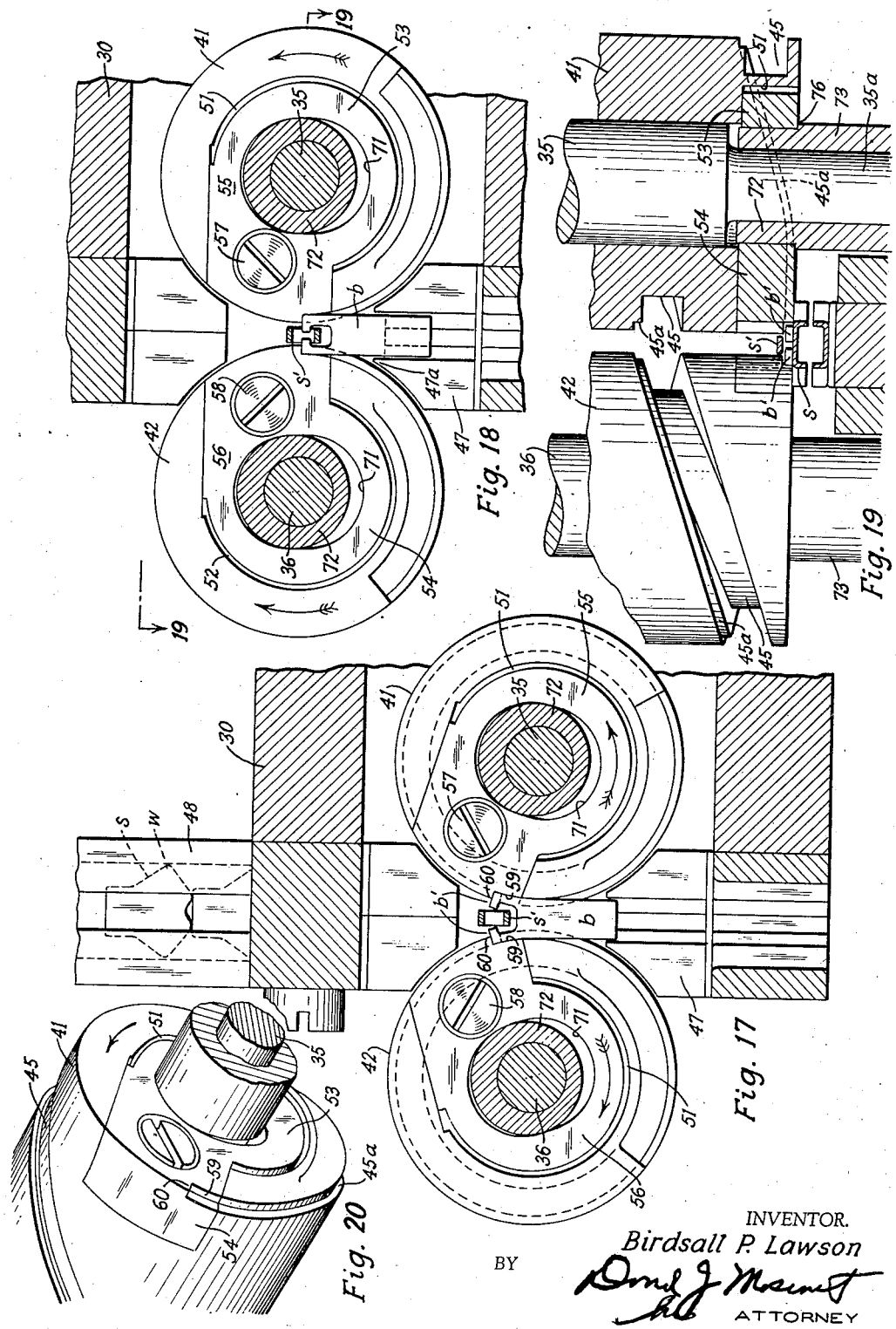

Patented Aug. 1, 1944

2,354,690

UNITED STATES PATENT OFFICE 2,354,690

MECHANISM FOR ASSEMBLING SLIDERS

Birdsall P. Lawson, Providence, R. I., assignor to Pilling Chain Company, Providence, R. I., a corporation of Rhode Island Application November 5, 1942, Serial No. 464,688

14 Claims. (Cl. 29—208)

This invention relates generally to the manufacture of sliders as used in separable fasteners and is more particularly directed to a mechanism for attaching the bails or so-called tabs to the lugs of the sliders, for relative hinged movement, whereby the bail may be grasped for manipulation of the slider to actuate the interlockable elements of the fasteners into and out of engagement.

Slider bails or tabs, in accordance with standard practice, embody attaching lugs at one end, to form a hinge connection with the central lug of the slider, the bail or tab being preformed with the attaching lugs relatively spaced for the entry of the slider lug therebetween, the lugs of the bail being then compacted under pressure to reduce the area of their spacing or bring them together within the slider lug and complete the slider assembly. Various mechanisms and methods are now employed for contacting the bail lugs in hinged engagement with the lug of the slider. However, these involve a multiplicity of operations or the use of more or less complicated mechanical movements that are not capable of sustained high speed operation and otherwise render the cost of the assembly of the bail with the slider excessive, as compared to the cost of other operations in the production of the elements of the slider unit.

The primary object of this invention, therefore, is to provide a simple and highly efficient mechanism for assembling the bails or tabs in hinged connection with the slider lug, which will be capable of dependable operation under high speed production requirements and thereby materially reduce the cost of the assembly operation which it is designed to perform.

Another important object of this invention is to provide a mechanism, as aforesaid, which is adapted to function in the assembly of bails and sliders of different widths, within the conventional limits of slider sizes, so that separate equipment for different slider or bail sizes is not required, as in the operation or use of many of the assembly mechanisms now available.

It is also an object of this invention to provide a mechanism to which the bails and sliders may be independently introduced to be automatically associated therein and the bails and sliders hingedly connected in a continuing operation, the completed units being automatically discharged from the mechanism in rapid succession, the elements of the mechanism being so conformed and cooperatively assembled that waste, flowing from deformation of the work within the machine, by jamming or from other causes, as occurs in many existing mechanisms, is entirely eliminated, thus further adding to the advantages, economic and otherwise, which flow from the use of my mechanism.

Other objects and advantages that reside in the practicing of my invention will become manifest as the description proceeds and I would have it understood that I reserve unto myself all right to the full range of equivalents, both in structure and in use, to which I may be entitled within the purview of the appended claims.

In the accompanying drawings, I have shown a preferred and highly practical embodiment of my invention, which is of a rugged and durable construction, so as to withstand the requirements of continuous high speed production. It will be understood, however, that changes in details of structure may be made to meet specific operation and other requirements, within the spirit and scope of my invention.

In the drawings:

Figure 1 is a front elevation of a machine conforming to my invention.

Figure 2 is a view in perspective of a slider prior to the attachment of a bail thereto.

Figure 3 is a similar view of a bail, with its lugs distended for attachment to a slider lug.

Figure 4 is a view in perspective of a slider with bail attached.

Figure 5 is a top plan view of the structure of Figure 1, taken on the line 5—5 thereof.

Figure 6 is a vertical longitudinal section on the line 6—6 of Figure 5.

Figure 7 is a horizontal longitudinal sectional view on the line 7—7 of Figure 6.

Figure 8 is an end elevation of the structure, taken from the line 8—8 of Figure 7.

Figure 9 is a sectional view, showing the disposition of a slider with an associated bail just prior to its advancement to the bail-attaching position.

Figure 10 is a similar view showing the slider and associated bail at the bail-attaching position.

Figure 11 is a transverse section on the line 11—11 of Figure 7.

Figure 12 is a view similar to Figure 11, of another stage of the entry of a bail into the spiral or worm groove.

Figure 13 is a cross-sectional view on the line 13—13 of Figure 6.

Figure 14 is a vertical cross-sectional view on the line 14—14 of Figure 7, illustrative of the introduction of a slider to a bail in the operation of the spirals.

Figure 15 corresponds to Figure 14, illustrating a further step in the association of the bail with a slider.

Figure 16 is a cross-section on the line 16—16 of Figure 6.

Figure 17 is a view partly in section, on the line 17—17 of Figure 7, showing the cooperating eccentrics which function in the upsetting of the bail lugs to attach the bail to the associated slider.

Figure 18 is a view similar to Figure 17, showing the effective surfaces of the eccentrics in their lug-upsetting positions.

Figure 19 is a horizontal cross-section on the line 19—19 of Figure 18; and

Figure 20 is a view in perspective of the eccentric end of one of the spirals of my mechanism.

Referring now to the drawings in detail, in which like characters of reference are employed to designate similar parts in the several views, my machine embodies a frame 30 having a base 31 adapted to be mounted upon and secured to a suitable support, as the table 32, beneath which is hung an electric motor 33. A pulley 34 keyed to the shaft 35 is driven counterclockwise from the motor 33, by a belt 40 traversing the pulley 37 rigid with the armature shaft of the motor, a gear 38 fixed to the shaft 35, in mesh with a similar gear 39 on the shaft 36 effecting simultaneous rotation of the latter shaft in a clockwise direction, the two shafts revolving at the same rate of speed, as will be evident.

Mounted on each of the shafts 35, 36, is a worm embodying two spirally grooved sections, the grooves of the two sections being of different dimensions, the oppositely positioned worms cooperating to convey the work through the machine to a position in which the bails are attached to the sliders and the completed units discharged from the machine, as hereinafter explained. Since the two worms 41 and 42 are similar in all respects, a detailed description of one of them will suffice for the purposes of this disclosure.

Taking the worm 41, mounted on the shaft 35 for rotation therewith, as the example, it will be observed that said worm is provided with a spiral groove 43, communicating with the peripheral slot 43a, adjacent the left hand end of the worm, as is viewed in Figure 1, and extending along the worm to the peripheral slot 44 located at a point approximately midway of the worm ends. A second spiral groove 45, communicating with said intermediate slot 44, extends to the opposite or right hand end of the worm. The pitch of the two spirals may be the same or dissimilar, the groove 43, together with the slot 43a, being shallower and narrower than the groove 45 and the slot 44, both of the latter being of the same cross-sectional area, the groove 45 embodying an internal shoulder 45a, complemental to one wall thereof, for the purposes which will be described.

A chute 46 is supported from the frame 30, which communicates with the vertical slot 30a in said frame, alined with the opposed portions of the slots 43a of the two worms, said chute being of a channel section and dimensioned for the reception of a slider bail b, with its lugs b' distended, as shown in Figure 3, the bails being stored in said chute for progression therethrough into position between the slots 43a of the oppositely rotating worms, with their attaching lugs b' in uppermost position, to be picked up by the coacting spirals, whereby they are conveyed to centrally located slot 44 for association with the sliders at that point, as will be explained. A block 47, embodying a guideway 47a, shaped for the reception of the entering bottom edge of the bail b, extends from the position of the slot 30a to the hinging position at the outer end of the worms, to support the bail in engagement with the grooves 43 and 45 in its progression therethrough, as will become evident, a tongue 49 in vertically spaced relation to said guideway 47a and extending from a point at the entering end of the groove 43 to the intermediate slot 44 projecting between the spread lugs b' of the bail to maintain the bail entered between the cooperating opposite spirals.

A second chute 48, which is sized for the reception of a series of bailless sliders s assembled therein, in superposed relation, with their neck portions n (see Figure 2) disposed toward the central slots 44 of the worms, with which said chute 48 is alined, functions as the slider-delivery means, the outermost edges of the wings w of the sliders riding the sides of the chute, with the slider lugs s' entered in the groove 48a of said chute 48 and disposed toward the bail delivery chute 46, as shown in Figures 5 and 6, the sliders being delivered to the cooperating slots 44 of the oppositely rotating worms, neck foremost.

A flat surface block or shoe 50, in vertically spaced relation to the guideway 47a of the block 47, may be provided, if desired, for traversing engagement by the open end portions of the slider wings w to maintain the slider in alinement with the grooves 45 in its passage therethrough from the entering slots 44 to the bail-hinging position at which the grooves 45 terminate.

At the position of the coacting slots 44, bail b advanced thereto in engagement with the spiral grooves 43 of the worms is associated with a slider s as it enters said slots 44, to progress therewith in engagement with the grooves 45, to the position in which the lugs b' of the bail are compacted, to attach the bail to the lug s' of the slider at the aforementioned hinging position, in the manner which will be explained. For the purposes of this description, the section of each of the worms 41, 42 which embodies the spiral groove 43 will be referred to as the bail groove section, while those sections of the worms in which the large grooves 45 are formed for the conjoint advancement of the associated bails and sliders will be termed the slider groove sections.

As will be observed, especially from Figures 17 to 20, inclusive, the ends of the worms 41, 42, at the terminals of their slider groove sections, are recessed, as at 51, 52, to receive the complemental portions 53, 54 of the jaw elements 55, 56, the respective jaw elements being interlocked with their supporting worms 41, 42, by the countersunk screws 57, 58.

Each jaw element embodies a striking surface 59 which is adapted to function in the compacting of the bail lugs, a surface projecting beyond said striking surface and disposed thereabove, as at 60, being formed to engage with the upper ends of the bail lugs to maintain the bail in position between the striking surfaces under the lug-compressing impact, it being obvious that the jaw elements will revolve with their respective worms 41, 42, to function simultaneously, in the performance of the hinging operation.

From the structure thus far described, it will be apparent that as a bail is introduced into the slots 43a of the oppositely rotating worms 41, 42, it will enter into engagement with the grooves in the bail sections of the worms and traverse the guideway 47a to the slider delivery position, where it will be associated with a slider delivered from the chute 48 between the walls of the opposite slots 44 to move with the slider through the slider groove sections of the worms, the side edges of the bails riding the shoulders 45a of the slider groove sections to maintain them at the same attitude which they assume in their movement in engagement with the grooves of the bail sections of the worms, the sliders, as heretofore pointed out, engaging with the base portions of the opposite grooves, the bail and slider being thus relatively supported in their transit of the grooves in the slider sections of the worms with the lugs b' of the bail disposed between the top and bottom surfaces of the slider lug s' and in laterally spaced relation to said lug (see Figure 14).

As the associated bail and slider reach the hinging position, the sides of the divergent lugs b' of the bail are engaged by the striker surfaces 59 of the oppositely rotating jaws, as shown in Figure 17, the jaw surfaces 60, impinging upon the upper ends of the bail lugs, resist upward bending of such lugs under the compression forces exerted thereon by the striking surfaces 59 and maintain the lugs in alinement with said striking surfaces, the positions of the bail and slider lugs and the coacting surfaces of the oppositely revolving jaws, in the hinging step of the operation, being clearly shown in Figures 18 and 19.

During the hinging operation, the body-portion of the slider, which protrudes beyond the jaw elements, is supported by the coaction of the slider lug and the base of the area between the lugs b' of the bail, as indicated at K, the bail being supported between the lug-engaging surfaces 59, it being obvious that the width of the distended bail lugs is greater than the root of said engaging surfaces. As the assembled unit, with the bail hinged to the slider, is urged outwardly, in the continuing opposite rotation of the worms 41, 42, the slide 63 yields to permit the slider to pass the opposed surface thereof adjacent the laterally spaced fixed abutment 64, 65, at the discharge position, and the assembled unit to enter the outlet passage 66 of the mechanism and issue therefrom, as at u. As will be seen from Figure 6, the slide 63 is spring-actuated, a spring 67 being interposed between the outer end of said slide and the sleeve 68 threaded in the bracket 69 embracing the rod 70, it being evident that the tension of the spring 67 may be regulated by the rotation of the sleeve 68 by means of the knurled head 68a thereof, the rod 70 being slidable longitudinally of said sleeve in response to the pressure applied to the slide 63 by the slider as it is urged out of the hinging position by the terminal portions of the shoulders 45a of the slider section grooves of the revolving worms.

To provide for the relative adjustment of the jaw elements 55, 56, to accommodate bails and sliders of a greater or lesser width than those herein shown, each of said jaw elements is elliptically bored, as at 71, for the reception of the eccentric head 72 of the sleeve 73 embodying a shoulder 76, the respective sleeves being adjustable circumferentially and longitudinally of the shafts 35 and 36, the nuts 75, in threaded engagement with said shafts, serving to lock the sleeves in adjusted position. Viewing Figure 18, it will be obvious that if the eccentrics 72 are oppositely rotated, toward the inside of the respective worms, the spacing between the opposed jaw elements will be decreased, while the opposite directional adjustment of said eccentrics will increase the distance between the coacting jaws.

As will be apparent, especially from Figures 7 and 19, the sleeves 73 also function to maintain the jaw elements and worms in cooperative assembled relation on the respective shafts 35, 36, the aforesaid shoulders 76 on said sleeves, in abutting engagement with the opposed surfaces of the jaw elements 55, 56, exerting clamping effort longitudinally of each shaft assembly, in response to the tightening of the nuts 75, following the rotative adjustment of the eccentric heads within the jaw elements, as heretofore described.

From the foregoing description, it will be manifest that I have provided a mechanism of a rugged and durable construction which will successively deliver the associated bails and sliders to the hinging position for the interconnection of the two slider elements in their proper relationship. While I have provided a guideway, as at 47, between the rotating worms which is adapted to be traversed by the bails in their movement to the position in which they are associated with the sliders, this guideway, together with the aforesaid flat block or shoe 50 may be omitted, the opposed grooves functioning to support the bails and, latterly, the associated bails and sliders in their movement between the oppositely rotating worms to the hinging position as described. This flows from the fact that the space between the roots of the opposed grooves is less than the width of the bail at the widest part of the distended lugs thereof, it being obvious that since the bail is supported between the coacting surfaces of the opposite grooves, it will in turn function to support the slider as the latter is introduced to the bail for the conjoint movement of the bail and slider to the hinging position, as and in the manner heretofore explained. It will be evident that the grooves of the cooperating worms may be so dimensioned with respect to the work that they are designed to engage, that sliders and bails of different widths than herein illustrated, within the limits of conventional commercial production, may traverse the machine, without danger of jamming, to positively eliminate waste which results from such jamming, it being understood, of course, that in a specific continuous operation, the bails and sliders are of uniform dimensions.

I claim:

1. A mechanism for attaching bails to sliders for separable fasteners, including a pair of oppositely rotating members, a stationary guideway between said members, each of said members having a circumferential spiral groove of a width corresponding substantially to the thickness of a bail, means for delivering a bail to said groove to traverse said guideway in engagement with said groove, with its attaching lugs in uppermost position, said bail-receiving groove terminating in a peripheral slot intermediate the ends of said member, of a width corresponding substantially to the thickness of a slider, a second circumferential spiral groove of the same width as said slot extending to the opposite end of said member, means for delivering a slider to said slot with its lug disposed for entry between the attaching lugs of the bail advanced to said slot by the oppositely rotating members, for the conjoint movement of said bail and said slider longitudinally of said guideway in engagement with said second spiral groove, oppositely operating jaw elements associated with said members at the outer terminus of said second spiral groove coacting to compress the attaching lugs of said bail to connect said bail to the slider lug for relative hinged movement and means for delivering the assembled unit from said mechanism.

2. A mechanism for attaching bails to sliders for separable fasteners, including a pair of oppositely rotating members, a stationary guideway between said members, each of said members having a circumferential spiral groove of a width corresponding substantially to the thickness of a bail, means for delivering a bail to said groove to traverse said guideway in engagement with said groove, with its attaching lugs in uppermost position, said bail-receiving groove terminating in a peripheral slot intermediate the ends of said member, of a width corresponding substantially to the thickness of a slider, a second circumferential spiral groove of the same width as said slot extending to the opposite end of said member, means for delivering a slider to said slot with its lug disposed for entry between the attaching lugs of the bail advanced to said slot by the oppositely rotating members, for the conjoint movement of said bail and said slider longitudinally of said guideway in engagement with said second spiral groove, jaw elements associated with said members at the outer terminus of said second spiral groove for relative adjustment and means rotating with said members effective upon said elements to interlock them with said members for opposite actuation to compress the attaching lugs of said bail and connect said bail to the slider lug for relative hinged movement, and means for delivering the assembled unit from said mechanism.

3. A mechanism for attaching bails to sliders for separable fasteners, including a pair of oppositely revoluble cylindrical members, each embodying a peripheral slot, adjacent one end, and a circumferential spiral groove communicating with said slot, said slot and said groove being of a width substantially equal to the thickness of a bail, said groove terminating in a peripheral slot midway of the respective ends of said member of a width approximating the thickness of a slider, a second circumferential spiral groove formed in said member of the same width as said second peripheral slot and extending from said latter slot to the opposite end of said member, means associated with said first peripheral slot for introducing a bail thereto, with its spaced attaching lugs in uppermost position, means for admitting a slider to said second peripheral slot with its lug directed toward the bail-engaging groove, a guideway located between said members for supporting a bail therebetween in engagement with the bail-engaging groove, for movement between said revolving members to said second peripheral slot to enter said second spiral groove in association with a slider introduced thereto through said second peripheral slot, with the attaching lugs of said bail spanning said slider lug, for the conjoint movement of said bail and said slider through said second spiral groove in response to the continuing opposite rotative movement of said members, and oppositely actuatable jaw elements associated with said members at the outer terminus of the second spiral groove coacting to contract the attaching lugs of said bail within the area of the slider lug to connect said bail to the slider for relative hinged movement and means for discharging the assembled unit from said mechanism.

4. A mechanism for attaching bails to sliders for separable fasteners, including a pair of oppositely rotatable cylindrical members, a stationary guideway between said members, means adjacent one end of said mechanism for delivering bails to said guideway in a substantially vertical position with its attaching lugs uppermost, means in longitudinally spaced relation to said bail-delivering means for delivering a slider to a position intermediate the ends of said members with its lug disposed in the direction of said bail-delivering means, means associated with said rotating members for conveying a bail delivered to said guideway to the position of said slider-delivery means for juxtaposition with such slider with the attaching lugs of said bail spanning the lug of said slider, means for effecting the conjoint movement of the associated bail and slider between said rotating members to a terminal position and devices carried by said members at such terminal position operable in the opposite rotation of said members to engage the outer surfaces of the bail-attaching lugs and compress said lugs to enter them within the area of the slider lug to connect the slider and bail for relative hinged movement.

5. A mechanism for attaching bails to sliders for separable fasteners, including a pair of oppositely rotatable cylindrical members, a stationary guideway between said members, means adjacent one end of said mechanism for delivering bails to said guideway in a substantially vertical position with its attaching lugs uppermost, means in longitudinally spaced relation to said bail-delivering means for delivering a slider to a position intermediate the ends of said members with its lug disposed in the direction of said bail-delivering means, means associated with said rotating members for conveying a bail delivered to said guideway to the position of said slider-delivery means for association with such slider with the attaching lugs of said bail spanning the lug of said slider, means for effecting the conjoint movement of the associated bail and slider between said rotating members to a terminal position, oppositely rotating jaw elements carried by said members at said terminal position for relative opposite adjustment embodying surfaces adapted to engage the distended attaching lugs of said bail and compress them within the area of the slider lug to connect the bail to the slider for relative hinged movement, and means for positively connecting said elements with said members for the opposite actuation of said jaw elements to compress the attaching lugs of the bail in timed relation to the disposition of the associated bail and slider at said terminal position in their movement between said members.

6. A mechanism for attaching bails to sliders for separable fasteners, including a pair of oppositely rotatable cylindrical members, a stationary guideway between said members, means adjacent one end of said mechanism for delivering bails to said guideway in a substantially vertical position with its attaching lugs uppermost, means in longitudinally spaced relation to said bail-delivering means for delivering a slider to a position intermediate the ends of said members with its lug disposed in the direction of said bail-delivering means, means associated with said rotating members for conveying a bail delivered to said guideway to the position of said slider-delivery means for association with such slider with the attaching lugs of said bail spanning the lug of said slider, means for effecting the conjoint movement of the associated bail and slider between said rotating members to a terminal position, jaw elements associated with said members at said terminal position for relative opposite adjustment embodying surfaces adapted to engage the distended attaching lugs of said bail and compress them within the area of the slider lug to connect the bail to the slider for relative hinged movement, means rotating with said members for connecting said jaw elements thereto for oppositely actuating said jaws to compress said bail-attaching lugs and spring actuated means for controlling the expulsion of the assembled unit from said terminal position, sequentially to the functioning of said jaws.

7. A mechanism for attaching bails to sliders for separable fasteners, including a pair of oppositely rotating members, a stationary guideway between said members, each of said members having a circumferential spiral groove of a width corresponding substantially to the thickness of a bail, means for delivering a bail to said groove to traverse said guideway in engagement with said groove, with its attaching lugs in uppermost position, said bail-receiving groove terminating in a peripheral slot intermediate the ends of said member, of a width corresponding substantially to the thickness of a slider, a second circumferential spiral groove of the same width as said slot extending to the opposite end of said member, means for delivering a slider to said slot with its lug disposed for entry between the attaching lugs of the bail advanced to said slot by the oppositely rotating members, for the conjoint movement of said bail and said slider longitudinally of said guideway in engagement with said second spiral groove, said second spiral groove embodying surfaces for engaging the divergent portions of the side edges of the bail to maintain the bail in association with the slider, with the attaching lugs of said bail spanning the slider lug, during such conjoint movement of the bail and slider through said second spiral groove, jaw elements associated with said members for oppositely directional rotation therewith at the outer ends of the respective second spiral grooves in said members, said jaw elements embodying surfaces for engaging the distended attaching lugs of a bail to compress them into position within the area of the lug of the associated slider and other surfaces for engagement with the ends of the bail lugs and the upper end of the slider lug.

8. A mechanism for attaching bails to sliders for separable fasteners, including a pair of oppositely rotating members, a stationary guideway between said members, each of said members having a circumferential spiral groove of a width corresponding substantially to the thickness of a bail, means for delivering a bail to said groove to traverse said guideway in engagement with said groove, with its attaching lugs in uppermost position, said bail-receiving groove terminating in a peripheral slot intermediate the ends of said member, of a width corresponding substantially to the thickness of a slider, a second circumferential spiral groove of the same width as said slot extending to the opposite end of said member, means for delivering a slider to said slot with its lug disposed for entry between the attaching lugs of the bail advanced to said slot by the oppositely rotating members, for the conjoint movement of said bail and said slider longitudinally of said guideway in engagement with said second spiral groove, said second spiral groove embodying surfaces for engaging the divergent portions of the side edges of the bail to maintain the bail in association with the slider, with the attaching lugs of said bail spanning the slider lug, during such conjoint movement of the bail and slider through said second spiral groove, jaw elements associated with said members for oppositely directional rotation therewith at the outer ends of the respective second spiral grooves in said members, said jaw elements embodying surfaces for engaging the distended attaching lugs of a bail to compress them into position within the area of the lug of the associated slider and other surfaces for engagement with the ends of the bail lugs and the upper end of the slider lug; and means formed for yieldable engagement with a slider at the jaw element adapted to support the slider against downward movement during the functioning of said jaw elements, said means being yieldable in response to the expulsion of the assembled unit from the jaw element position in the continuing rotative movement of said members to free the slider and permit the assembled unit to be discharged from said mechanism.

9. A mechanism for connecting bails to separable fastener sliders for relative hinged movement, including a pair of oppositely rotating members, each embodying a spiral bail groove section and a spiral slider groove section, means for successively delivering bails between said members for engagement with the opposite bail grooves thereof, for movement in engagement with said grooves in a substantially vertical plane, means for introducing a slider to each bail at the terminus of the coacting bail groove sections of said members and transferring the bail and the associated slider to the slider groove sections of said members for conjoint movement in engagement with said slider grooves, and means for interconnecting the lugs of a bail and slider progressing in association through the coacting slider groove sections of said members for relative hinged movement, at the terminus of said slider groove sections.

10. A mechanism for connecting bails to separable fastener sliders for relative hinged movement, including a pair of oppositely rotating members, each embodying a spiral bail groove section and a spiral slider groove section, means for successively delivering bails between said members for engagement with the opposite bail grooves thereof, for movement in engagement with said grooves in a substantially vertical plane, means for introducing a slider to each bail at the terminus of the coacting bail groove sections of said members and transferring the bail and the associated slider to the slider groove sections of said members for conjoint movement in engagement with said slider grooves, oppositely rotating jaw elements associated with said members at the terminus of said slider groove sections adapted to compact the attaching lugs of a bail into hinged connection with the lug of the conjointly moving slider and means external of said jaw elements for supporting the slider during the functioning of said jaw elements.

11. A mechanism for connecting bails to separable fastener sliders for relative hinged movement, including a pair of oppositely rotating members, each embodying a spiral bail groove section and a spiral slider groove section, means for successively delivering bails between said members for engagement with the opposite bail grooves thereof, for movement in engagement with said grooves in a substantially vertical plane, means for introducing a slider to each bail at the terminus of the coacting bail groove sections of said members and transferring the bail and the associated slider to the slider groove sections of said members for conjoint movement in engagement with said slider grooves, oppositely rotating jaw elements associated with said members at the terminus of said slider groove sections having surfaces formed for engagement with the outer edges of the attaching lugs of a bail to compact said lugs into hinged connection with the slider lug and other surfaces for engaging the slider lug to resist displacement of the slider lug from hinging position in the compacting of the bail lugs, and means separate from said jaw elements for supporting the slider at a point below the lug thereof, said latter means being yieldable to respond to the expulsion of the interconnected bail and slider from the hinged position to permit the slider unit to be discharged from said mechanism.

12. A mechanism for connecting bails to separable fastener sliders for relative hinged movement, including a pair of oppositely rotatable members, each embodying a spiral bail groove section and a spiral slider groove section, means for successively delivering bails between said members with their distending attaching lugs in uppermost position for disposition in engagement with the opposite bail grooves for movement along said grooves in a substantially vertical plane, means for introducing a slider to each bail at the terminus of the coacting bail groove sections to dispose the lug of the slider between the distended attaching lugs of the bail and transferring the bail and associated slider to the slider groove sections of said members for conjoint movement in supported engagement therewith, and means for interconnecting the lugs of the bail with the lug of the slider for relative hinged movement at the terminus of the slider groove sections operative in response to the rotative movement of said members.

13. A mechanism for connecting bails to separable fastener sliders for relative hinged movement, including a pair of revoluble members, mounted for opposite rotation in circumferentially spaced relation, each embodying surfaces coacting to guide a bail for movement between said members in a path longitudinally thereof, means for introducing a slider between said members at a predetermined point in the movement of the bail therebetween to dispose the lug of the slider between the attaching lugs of the bail, surfaces coacting to propel the associated bail and slider between said members and means interlocked with said members for rotation therewith in opposite directions for engaging the attaching lugs of the bail and effective thereon to compress said lugs within the area of the slider lug, to connect said bail and slider for relative hinged movement, said latter means functioning as the associated bail and slider are propelled to a position for discharge from between said members by the latter coacting surfaces of said members.

14. Mechanism for automatically assembling two normally separate elements of an article of manufacture in engagement for relative movement, including a pair of members oppositely rotating in parallel spaced relation to provide a passage therebetween, means for entering one of the aforesaid elements between said members for engagement with peripheral surfaces of said members effective thereon, in the rotation of said members, to propel said element longitudinally of said passage, means for introducing the second element to said passage at a predetermined point in the movement of said first element therethrough, for association with said first element, whereby said means will function to propel the two elements in association along said passage, in the continuing rotation of said members, and means carried by said members and operable in the opposite rotation of these latter to effect the connection of one of said elements to the other at the terminal point of the conjoint progression of the two elements along said passage.

BIRDSALL P. LAWSON.